June 2, 1970    R. J. JONES    3,515,465
HIGH PRESSURE SIGHTING LENS WITH RELIEF PORT
Filed June 28, 1967

INVENTOR
RICHARD J. JONES

BY
ATTORNEY

United States Patent Office 3,515,465
Patented June 2, 1970

3,515,465
HIGH PRESSURE SIGHTING LENS WITH RELIEF PORT
Richard J. Jones, Annapolis, Md., assignor to the United States of America as represented by the Secretary of the Navy
Filed June 28, 1967, Ser. No. 650,161
Int. Cl. G02b 5/00, 7/00
U.S. Cl. 350—319  7 Claims

ABSTRACT OF THE DISCLOSURE

An apparatus adapted to view highly pressurized fluids. The apparatus provides a high pressure chamber, a transparent lens for viewing the pressure chamber and a locking ring for retaining the lens. An annular sealing means and a fluid relief port are cooperatively associated to provide additional safety to the viewing personnel.

BACKGROUND OF THE INVENTION

The present invention relates to an optical viewer and more particularly to a device for viewing the pressurized fluids at the pressures attained in a high pressure dew point indicator, wherein, fluid pressures in excess of 18,000 p.s.i. may be safely viewed.

SUMMARY

The invention relates to an optical viewing device and more particularly to a device for viewing highly pressurized fluids.

It is well known that the dew point of a gas is an indication of its dryness. In many industries, and in laboratories as well, it is of importance to determine the dryness of gases. Various instruments have heretofore been proposed for this purpose, as illustrated by Ford's instrument of a Self-Cooling Moisture Indicator for Gases, U.S. patent application No. 624,101, of which this application is an improvement thereof. These indicative instruments generally utilize an optical viewing device for viewing the status of the pressurized fluid. Such viewing devices should provide a large viewing area, for increased light transmission, and constructional safety to insure the safety of the operating personnel.

An object of this invention is, therefore, to provide an optical viewing device for viewing highly pressurized fluid.

Another object is to provide a viewing device with a large light transmission and viewing area.

A further object of the invention is to provide safety means for the safety of the operating personnel.

These and further objects and advantages of this invention will become apparent from the following detailed specification in conjunction with the accompanying drawings wherein.

Figure 1:
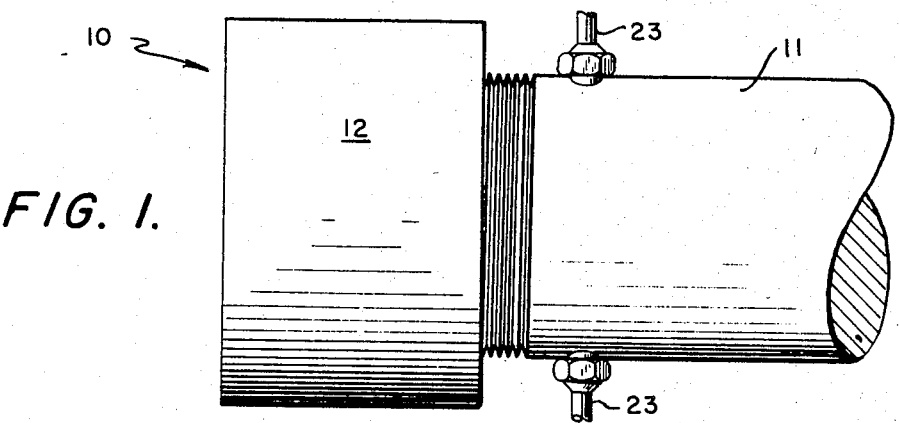
FIG. 1 is a side elevational view of the optical viewing device.

Referring now to the drawings wherein like reference numerals designate similar or corresponding parts throughout the several views, there is shown by way of illustration an optical viewing device as indicated generally by the reference numeral 10.

Figure 2:
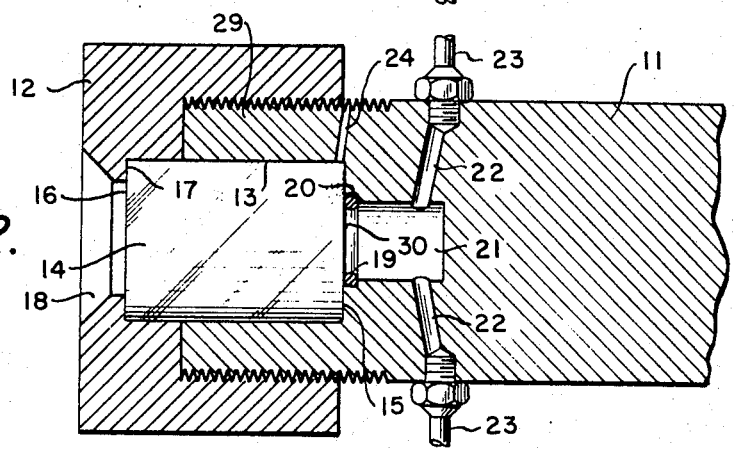
FIG. 2 is a vertical cross sectional view of FIG. 1.

Referring in detail to the drawings and more particularly to FIGS. 1 and 2, the optical viewing device 10 is shown as comprising a cylindrical housing 11 having a first end 29 and a second end (not shown) portion of this housing forming part of and structurally supporting the viewing device 10. The housing 11 is provided with an inner bore defining a cylindrical pressure chamber 21, a coaxially aligned counterbore 20, and a coaxially aligned outer bore to define a cylindrical lens chamber 13. Thus, the inner bore, the counterbore and the outer bore are coaxially aligned with each other.

A cylindrical locking ring 12, which is threaded over the first end 29, is provided with an axial bore, which is of the same diameter as the outer bore of the housing 11 and coaxial therewith when in locking position, and a radial inner flange surface of a flange 17. This generally cylindrical lens chamber 13, defined cooperatively by the locking ring 12 and the housing 11, contains a generally cylindrical transparent lens 14 having a diameter substantially equal to the diameter of the lens chamber 13. The locking ring 12, is further provided with a circular optical viewing port 18 to permit light to pass through the lens 14 and illuminate the pressure chamber 21. The viewing port 18 also enables the viewing personnel to view the fluid withi nthe pressure chamber 21. It will be apparent that a large viewing port is desirable to insure proper illumination and viewing of the chamber 21. However, as will become apparent, the area of the port 18 is limited by the structural strength of the materials utilized in the construction of the device, the pressures attained within the pressure chamber 21 and the area of the lens 14 subjected to the pressurized fluid, i.e., the area of the pressure chamber port 30.

The generally cylindrical high pressure chamber 21, defined cooperatively by a first end surface 15, of the lens 14, and the inner bore of the housing 11, is provided with fluid ports 22 and fittings 23 for the ingress and egress of pressurized fluid into and from the pressure chamber 21.

A resilient annular sealing element 19, of the O-ring type, is disposed between the substantially flat first end surface 15, of the lens 14, and the counterbore 20 of the pressure chamber 21. The inner flange surface of flange 17, of the locking ring 12, engages a substantially flat second end surface 16, of the lens 14, urging the lens 14 into engagement with the sealing element 19 to thus seal the pressure chamber 21. As will be apparent, the circular area 30 of the end surface 16, which is subjected to the pressurized fluid, is peripherally limited by the circular engagement between the O-ring 19 and the first end surface 15.

Since the lens 14 is generally composed of a relatively brittle material, such as glass, it is apparent that the lens shearing and bending stresses are critical design factors. To provide safe shearing and bending stresses, such as occur when viewing fluid pressurized in excess of 18,000 p.s.i., the lens 14 is provided with a longitudinal thickness at least equal to the diameter of the cylindrical lens 14. To further reduce the shearing stress and yet attain the advantages of a larger viewing port 18, in relation to the size of the pressure chamber port 30, a truncated conical shear surface is substantially defined by the inner circumferential engagement of the inner flange surface of flange 17, with the lens 14, and the circumferential engagement of the sealing element 19, with the lens 14. Thus, for a given pressure level, the shearing stress within the lens is reduced and the surface area of the viewing port 18 is increased.

Another critical design factor is to minimize the impact stress upon the flange 17 and the area of the lens surface 16 in contact with flange 17, as when the pressure chamber is rapidly pressurized. Thus, the circular, washer-like contact area between the inner flange surface of flange 17 and the lens surface 16 is substantially larger than the area of the circular port 30 to distribute the force exerted upon the lens surface 30 over a larger, contact area and thereby reduce the impact stress.

It is critical when viewing pressurized fluids, as with such a device, that the viewing device provide a high degree of safety to the viewing personnel to safeguard the device from exploding while being opearted. It will be apparent that the viewing device 10 is structurally designed to withstand higher fluid pressures than pressures normally attained within the pressure chamber 21, however, an additional safety means is incorporated for additional safety to the viewing personnel. This additional safety means includes a safety relief port 24 which is operatively connected between the lens chamber 13 and the atmospheric exterior of the housing 11. In the event the fluid pressure exceeds a predetermined value, the sealing element will tend to deflect or extrude between the lens 14 and the counterbore 20, thereby allowing the highly pressurized fluid to escape to the lens chamber 13 and to the atmosphere via the relief port 24. It is apparent, therefore, that the sealing element 19 not only seals the pressure chamber 13 but it also operatively connects to the relief port 24 to thereby provide a fluid pressure released means should the fluid pressure exceed a predetermined value. Moreover, it is apparent that the length of the locking ring 12 is limited so as not to cover or seal the relief port 24.

Figure 3:
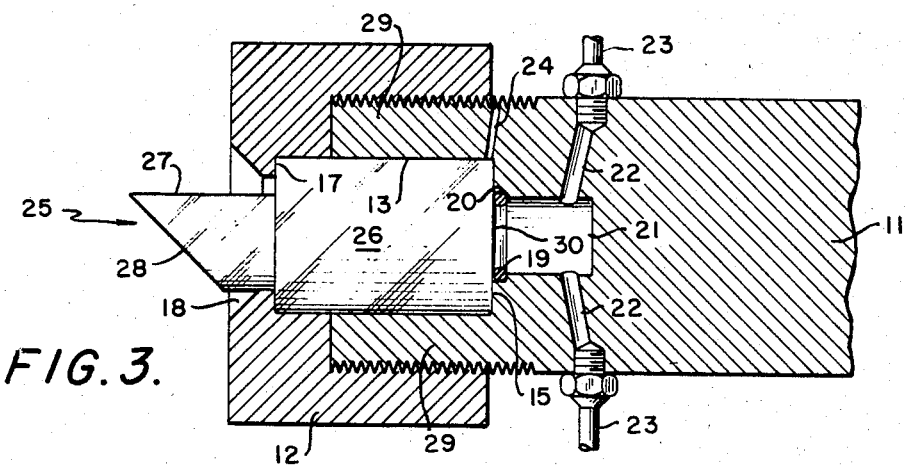
FIG. 3 is a vertical cross sectional view, similar to FIG. 2, showing another embodiment of this invention.
Figure 4:
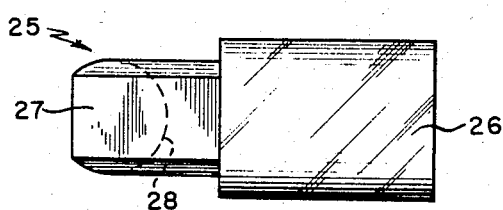
FIG. 4 is a top plan view showing the viewing lens of the second embodiment.

In referring to FIGS. 3 and 4, a second embodiment of this invention, a transparent prism 25 is operatively connected to the cylindrical transparent lens 26. In the instant embodiment, the prism 25 is provided with a substantially flat viewing surface 27 and a substantially flat reflective surface 28. It will be apparent that an operator may view the pressurized fluid, contained within the pressure chamber 21, from a position other than axially in front of the lens, providing additional safety to the viewing personnel in the event the lens fractures while viewing the pressurized fluid.

The invention described herein may be manufactured and used by or for the Government of the United States of America for governmental purposes without the payment of any royalties thereon or therefor.

Having described the invention, it will be apparent that many modifications will be obvious to one skilled in the art.

What is claimed and desired to be secured by Letters Patent of the United States is:

1. An optical viewing device for viewing highly pressurized fluid, comprising:
   a substantially cylindrical housing having a first end;
   said first end having a cylindrical inner bore and a cylindrical outer bore coaxially aligned with said inner bore, said outer bore having a larger diameter than said inner bore thereby providing an end wall for said outer bore;
   a counterbore in the cylindrical wall of said inner bore at the end adjacent said outer bore;
   a locking ring, securely engaged with said housing first end, having a radially inwardly extending flange;
   said flange and said outer bore cooperatively defining a cylindrical lens chamber;
   a transparent lens, contained within said lens chamber, having a first end surface and a second end surface;
   said first end surface being substantially flat and abutting the end wall of said outer bore;
   said flange securably engaged to said lens second end surface to retain said lens within said lens chamber;
   a cylindrical pressure chamber cooperatively defined by said inner core and said lens first end surface;
   a resilient annular sealing element, having an inner diameter larger than the diameter of said inner bore, disposed in said counterbore to provide a seal between said lens first end surface and the end wall of said outer bore; and
   a pressure relief port operatively connected to said lens chamber and the outer surface of said housing to provide for the release of pressurized fluid from said lens chamber upon sealing failure of said resilient annular sealing element.

2. An optical viewing device for viewing highly pressurized fluid, as defined in claim 1 wherein:
   said lens is cylindrically shaped having a diametrical dimension substantially the same as the diametrical dimension of said cylindrical lens chamber.

3. An optical viewing device for viewing highly pressurized fluid, as defined in claim 2 wherein:
   said flange defines a circular viewing port having a larger diametrical dimension than the diametrical dimension of said cylindrical pressure chamber to thereby minimize the shearing stress within said lens.

4. An optical viewing device for viewing pressurized fluid, as defined by claim 1, wherein:
   said lens comprises a prism extending beyond said locking ring to permit non-axial viewing of said pressure chamber.

5. An optical viewing device for viewing highly pressurized fluid, as defined in claim 2 wherein:
   said lens has a longitudinal dimension greater than the diametrical dimension of said lens thereby minimizing the bending stress within said lens.

6. An optical viewing device for viewing highly pressurized fluid, as defined in claim 5 wherein:
   said lens second end surface is substantially flat.

7. An optical viewing device for viewing highly pressurized fluid, as defined in claim 2 wherein:
   the area of said lens engaged by said flange is larger than the area of said lens subjected to the pressurized fluid.

References Cited

UNITED STATES PATENTS 2,713,989  7/1955  Bryant.
3,014,981  12/1961  Appl _____ 116—117 X

FOREIGN PATENTS 26,918  11/1896  Great Britain.
1,053,306  3/1959  Germany.

DAVID SCHONBERG, Primary Examiner

T. H. KUSMER, Assistant Examiner

U.S. Cl: X.R.

73—334; 137—559; 350—67, 252